United States Patent
Bauchot et al.

(10) Patent No.: US 7,187,953 B2
(45) Date of Patent: Mar. 6, 2007

(54) SYSTEM FOR CONTROLLING WIRELESS COMMUNICATIONS FROM A MOVING VEHICLE

(75) Inventors: Frederic Bauchot, Saint Jeannet (FR); Gerard Marmigere, Drap (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 10/978,721

(22) Filed: Nov. 1, 2004

(65) Prior Publication Data
US 2005/0119002 A1   Jun. 2, 2005

(30) Foreign Application Priority Data
Nov. 27, 2003   (EP)   ................... 03368101

(51) Int. Cl.
*H04M 1/00*   (2006.01)
*H04Q 7/20*   (2006.01)
(52) U.S. Cl. ................. 455/569.2; 455/441; 455/569.1
(58) Field of Classification Search ............. 455/569.2, 455/441, 569.1
See application file for complete search history.

(56) References Cited

U.S. PATENT DOCUMENTS

| | | | | |
|---|---|---|---|---|
| 6,108,532 A * | 8/2000 | Matsuda et al. | ............ | 455/413 |
| 6,397,086 B1 * | 5/2002 | Chen | .................... | 455/569.2 |
| 6,580,973 B2 * | 6/2003 | Leivian et al. | ................. | 701/1 |
| 6,792,295 B1 * | 9/2004 | Hanevich et al. | ........ | 455/569.1 |
| 6,816,731 B1 * | 11/2004 | Maruyama | ................... | 455/441 |
| 6,993,367 B2 * | 1/2006 | Yamato et al. | ........... | 455/569.2 |
| 2001/0012781 A1 * | 8/2001 | Suzuki | ....................... | 455/456 |
| 2002/0137505 A1 * | 9/2002 | Eiche et al. | ................ | 455/425 |
| 2003/0083113 A1 * | 5/2003 | Chua et al. | ................. | 455/569 |
| 2003/0134660 A1 * | 7/2003 | Himmel et al. | ............ | 455/557 |
| 2004/0063472 A1 * | 4/2004 | Shimizu et al. | .......... | 455/569.1 |
| 2004/0198306 A1 * | 10/2004 | Singh et al. | ................ | 455/345 |
| 2004/0252027 A1 * | 12/2004 | Torkkola et al. | ........... | 340/576 |

FOREIGN PATENT DOCUMENTS

FR   2872658 A1 *   1/2006   .............. 455/569.2

\* cited by examiner

*Primary Examiner*—Nick Corsaro
*Assistant Examiner*—Christopher M. Brandt
(74) *Attorney, Agent, or Firm*—Norman L. Gundel; Hoffman, Warnick & D'Alessandro LLC

(57) ABSTRACT

The present invention is directed to a system for controlling, in a moving vehicle, wireless communications between a local and a remote party and more particularly to prevent any conversation in vehicles travelling above a predefined speed without cutting off wireless communication. If a wireless communication is detected and if the vehicle speed exceeds a first predefined speed limit, the wireless communication is suspended. When the vehicle speed decreases below a second predefined speed limit, the suspended wireless communication is re-established. The system comprises a wireless communication manager unit connected to both a conventional mobile communication system and a conventional free hand kit, the free hand kit being also connected to the mobile communication system.

12 Claims, 2 Drawing Sheets

SYSTEM FOR CONTROLLING WIRELESS COMMUNICATIONS FROM A MOVING VEHICLE

FIELD OF THE INVENTION

The present invention relates to wireless communications, and more particularly to a system for preventing mobile phone conversations in vehicles travelling above a predefined speed, without cutting off mobile communication.

BACKGROUND ART

Wireless communication is very common for private and business uses, and many businesses depend on this technology. In this context, an employee driving a car often receives a call on his/her mobile phone. Since it is very dangerous (and even forbidden according to particular national laws) to answer phone calls while driving a car, it is recommended that drivers switch off their mobile phones. However, switching off mobile phones may impact the efficiency of a business and may lead to the loss of some business opportunities. As such, it is desirable to solve this problem through a method and system which, on one hand, avoids active phone conversations from taking place from a car (and more generally from a moving vehicle), and on the other hand, does not cut off the wireless communication.

The problem to be resolved includes preventing any incoming or outgoing wireless communication from taking place when the vehicle speed exceeds a predefined threshold, while avoiding at the same time, the wireless communication from being cut off. Both parties engaged in the wireless communication (the caller and the called person) must thus be aware of: the current situation (active wireless communication plus vehicle speed above a predefined threshold); and the actions to take to leave this situation. Such actions can include: the end of the call by any one of the parties (by either the caller or the called person); or the reduction of the vehicle speed below the predefined threshold. As a result, the problem includes defining a "call suspension" state where any conversation is suspended with the possibility to leave this state either by ending the call or by reducing the vehicle speed.

It is also an objective to address this problem through a method and system which could be implemented and manufactured in a low cost device. Furthermore, the solution should neither depend on the physical characteristics of the wireless communication (frequency band) nor on the protocol for accessing the wireless communication. Indeed, there are today many different and incompatible wireless networks deployed all over the world and these networks do not share the same frequency bands and protocols. The problem is that the "network agility" required by the devices to support the major (if not all) wireless networks, leads to unaffordable cost and complexity.

It is also an objective to address this cost and complexity problem through a method and system which can be easily implemented without impacting the architecture and design of the current communication apparatus. Thus, the solution should be "external" to the communication apparatus (e.g., cellular phone). In other worlds, the solution should provide "apparatus agility."

The aforementioned problem of controlling wireless communications issued from or directed to a moving vehicle has been addressed in the literature and has resulted in several patent documents. However, each patent document shows severe limitations, as outlined below.

Japanese patent application JP 10 233836 entitled "On Vehicle Portable Telephone System" discloses a system and method where incoming calls received within a moving vehicle, when the vehicle exceeds a predefined speed limit, are directed to a voice mail system where the caller is invited to record a voice message, before the call is closed. With such a system, the call recipient within the moving vehicle does not have the opportunity to enter in communication with the originator of the call, even if the vehicle speed decreases below a predefined threshold. The call recipient must later connect to the voice mail system to determine if incoming calls were received during transit. In this Japanese patent application, the objective of defining a "call suspension" state is not met.

Japanese patent application JP 2001-103547 entitled "Call Receiving Controller for Wireless Communication Terminal, Controller for the Wireless Communication Terminal and In-Vehicle Wireless Communication System" discloses a system and method where incoming calls received within a moving vehicle, when the vehicle exceeds a predefined speed limit, are polluted by a system referred to as "bird clapper" or "jammer," preventing communication between parties. This method and system relies on a so-called "arrival-of-the-mail control unit" to discriminate the recipient phone number, which therefore directly depends on the wireless communication protocol. Furthermore the communication jamming can only be achieved within the frequency band where the wireless communication takes place. For these two reasons, the method and system disclosed in this patent application directly depends on the characteristics of the wireless communication channel and protocol, and therefore does not meet the objective of "network agility." Further, the method and system according to this Japanese patent application prevent wireless communication from taking place, without providing any opportunity to carry on the call if the speed of the vehicle decreases below a predefined threshold. Therefore, the objective to define a "call suspension" state is not met.

Japanese patent application JA 10 013502 entitled "Portable Telephone Set Used for Vehicle" discloses a system and method where incoming calls received within a moving vehicle, when the vehicle exceeds a predefined speed limit, are blocked by a computer on the vehicle which forces the cellular phone to enter into a state where wireless communications cannot be carried on. With such a system, the call recipient within the moving vehicle has no chance of knowing that an incoming call has been received. Therefore the objective to define a "call suspension" state is not met. Furthermore, the means required by this method and system for forcing the cellular phone to enter in a specific state clearly depend on the design and implementation of the cellular phone itself. Thus, the objective of "apparatus agility" is not met.

U.S. Pat. No. 6,108,532 entitled "Incoming Call Control Based on the Moving Speed of a Radio Communications Apparatus" discloses a system and method where the communication apparatus itself determines its speed by a fading pitch detection circuit aimed to detect the variation of a Received Signal Strength Indicator (RSSI). If this pitch detection circuit determines that the communication apparatus is moving above a predefined speed limit, then a voice message is played to the call initiator to inform him/her of the current situation preventing the call to take place. Therefore, the objective to define a "call suspension" state is not met. This method and system can only be implemented in an embodiment where the communication apparatus comprises the fading pitch detection circuit, missing therefore the objective of "apparatus agility."

Japanese patent application JP 11341570 entitled "Mobile Portable Telephone" discloses a method and system which determines if the output of a converter, which converts detected acceleration of a vehicle in which a mobile portable telephone is used into corresponding velocity, exceeds a predefined threshold value. The communication apparatus itself determines its speed by means of an acceleration detection system coupled with relevant integration algorithms. If the acceleration detection system determines that the communication apparatus is moving at a speed greater than a predefined threshold, then a specific communication mode for the portable device is forced to prevent the wireless communication to take place. Therefore the objective to define a "call suspension" state is not met. This method and system can only be implemented in an embodiment where the communication apparatus comprises an acceleration detection system. Therefore, the "apparatus agility" objective is not achieved.

Each of the aforementioned patent documents have one or multiple limitations preventing them from satisfactorily solving the problems previously raised. For example, none of these patents allows wireless communication to be suspended during a transient period until the vehicle speed decreases below a predefined threshold. Furthermore, the agility (either the network agility or the apparatus agility) required to build a simple and low cost implementation of the solution is not met by these documents.

SUMMARY OF THE INVENTION

An object of the present invention is to prevent phone conversations in vehicles travelling above a predefined speed, without cutting off wireless communication.

A further object of the present invention is to suspend communications until the vehicle speed decreases below a predefined threshold.

Another object of the present invention is to provide a simple and low cost solution with a minimal dependency on the wireless network and wireless apparatus.

The present invention is directed to a system for controlling, in a moving vehicle, wireless communications between a local and a remote party, and more particularly to prevent any conversation in vehicles travelling above a predefined speed without cutting off wireless communication. If a wireless communication is detected and if the vehicle speed exceeds a first predefined speed limit, the wireless communication is suspended. When the vehicle speed decreases below a second predefined speed limit, the suspended wireless communication is re-established. One advantage of the present invention is that the wireless communication is suspended and not cut off.

In one embodiment, the system comprises a wireless communication manager unit connected to both a conventional mobile communication system and a conventional free hand kit, the free hand kit being also connected to the mobile communication system.

The foregoing, together with other objects, features, and advantages of this invention can be better appreciated with reference to the following specification, claims and drawings.

BRIEF DESCRIPTION OF THE DRAWINGS

The objects, features, and advantages of the invention will best be understood by reference to the following detailed description of an illustrative detailed embodiment when read in conjunction with the accompanying drawings, wherein.

DETAILED DESCRIPTION OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
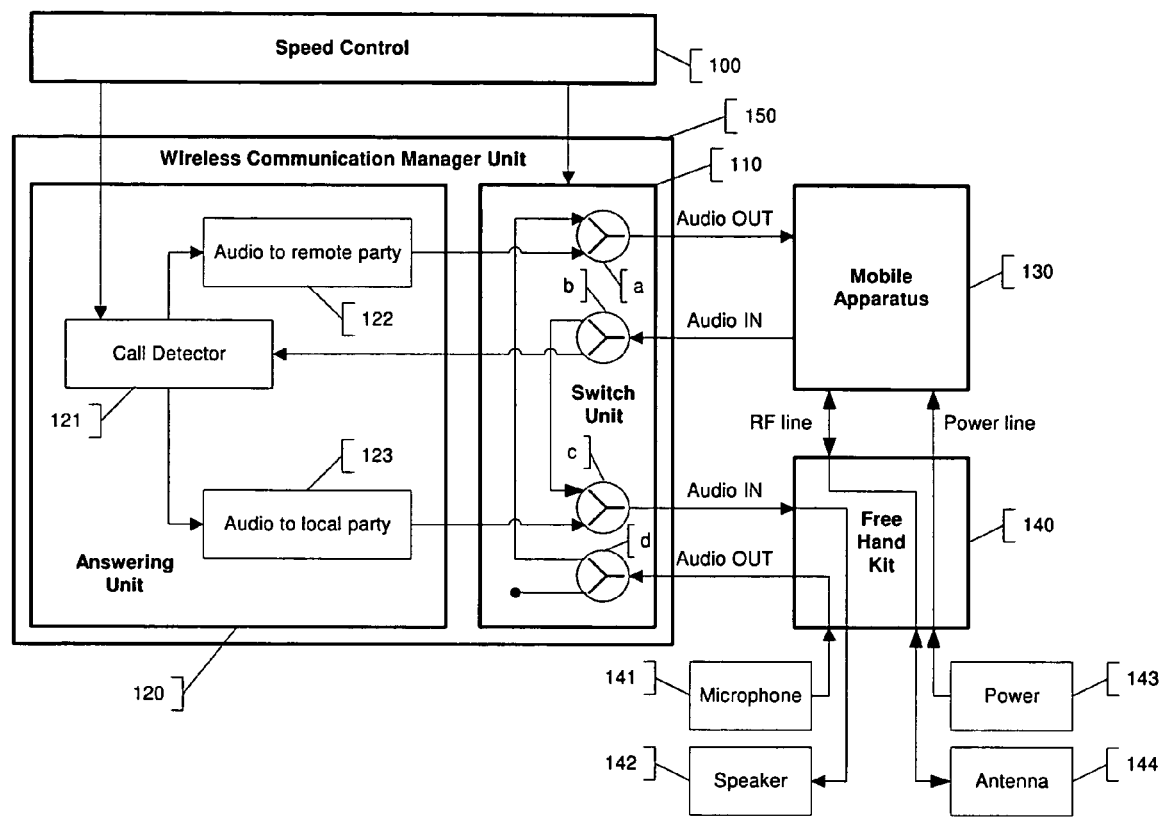
FIG. 1 is a schematic view of the different components involved in a preferred embodiment of the present invention.

FIG. 1 provides a schematic view of the different components involved in a preferred embodiment of the present invention. A conventional free hand kit 140 is connected to different devices available within the vehicle: a microphone 141, a speaker 142, an antenna 144, and a power source 143. The Free hand kit 140 is connected to a conventional mobile apparatus 130 for access to: power through a power line; RF connectivity through an RF line; and audio signals through an audio IN wire (from mobile apparatus 130 to speaker 142), and an audio OUT wire (from microphone 141 to mobile apparatus 130).

In a preferred embodiment, the mobile apparatus 130 is configured in an "auto-answer mode" in order to automatically take incoming calls. If this mode is not available, then the person in the vehicle must manually answer incoming calls. In both cases, the present invention operates the same way.

A conventional speed control component 100 provides information on the current speed of the vehicle hosting the different components of the present invention. Furthermore, the preferred embodiment comprises two additional components, which together form a wireless communication manager unit 150: a switch unit 110 placed between the mobile apparatus 130 and the free hand kit 140 on both audio lines (audio IN and audio OUT), and an answering unit 120 interfacing with the switch unit 110. Both the switch unit 110 and the answering unit 120 receive from the speed control component 100, information related to the current vehicle speed.

The Switch Unit 110 comprises four switch fabrics a, b, c, and d. Each of the switch fabrics connects an audio signal (shown on the right side of FIG. 1) with one of two other signals (shown on the left side of FIG. 1).

The answering unit 120 comprises three sub-components: a call detector circuit 121 which receives speed information from the speed control component 100, and the audio IN signal from switch fabric b of the switch unit 110; an audio to remote party circuit 122 which is controlled by the call detector circuit 121, and which feeds switch fabric a of the switch unit 110; and an audio to local party circuit 123 which is controlled by the call detector circuit 121, and which feeds switch fabric c of the switch unit 110.

Once the wireless communication manager unit 150 is powered, it executes a self-booting command named "wireless communication manager," or WCM for short, which implements the logic followed in the scenarios described below.

If the vehicle speed, as measured by the speed control component 100, is lower than or equal to a predefined threshold (note that this predefined threshold may be equal to 0 Km/h and is determined according to national legislation), the switch unit 110 links the mobile apparatus 130 to the free hand kit 140. In this case each of the four switch fabrics a, b, c, d connects the audio line (shown on the right side of FIG. 1) with the upper signal, as shown on the left side of FIG. 1. If the vehicle speed is greater than a predefined threshold, both the mobile apparatus 130 and the free hand kit 140 are linked to the answering unit 120 through the switch unit 110. In this case each of the four switch fabrics a, b, c, d connects the audio line (shown on the right side of FIG. 1) with the lower signal, as shown on the left side of FIG. 1.

When an incoming call is opened (typically but not necessarily thanks to the "auto-answering mode" of the mobile apparatus 130), and detected by the call detector circuit 121, audio features are activated. The audio to remote party circuit 122 sends a message to inform the remote party that the communication will be established soon, such as "I am currently driving my car, could you please wait for a few second so that I can stop my vehicle and take the call. Please keep on signaling your presence by voice to maintain the communication." This message transits through switch a of the switch unit 110 to the mobile apparatus 130. At the same time, the audio to local party circuit 123 informs the driver that a call is pending for him/her, using a message such as "A call is currently pending for you, could you please stop your vehicle and take the call." This message transits through switch fabric c of the switch unit 110 to the free hand kit 140, and then to the speaker 142. Both messages can be repeated on a periodic basis, so that the parties attempting to establish the communication are made aware that the call is still pending. It should be noted that the activation of these messages takes place regardless of the originator of the call (an external caller or the driver of the vehicle), even if most of the cases the call is an incoming call originated from an external caller.

If the external caller or the vehicle driver has decided to cancel the call, then the call detector circuit 121 will no longer detect an active call. Consequently, after a delay typically equal to the length of the audio message for the remote party, both messages are no longer played.

In a preferred embodiment of the present invention, the WCM command is executed by a finite state machine operating as part of the wireless communication manager unit 150. This finite state machine receives four different events: a "High Speed" event generated by the speed control component 100 when the vehicle speed becomes greater than a predefined threshold; a "Low Speed" event generated by the speed control component 100 when the vehicle speed becomes lower than a predefined threshold. (It must be noted that no assumption is made to the fact that the speed threshold associated with the "High Speed" event can be identical to the speed threshold associated to the "Low Speed" event. Indeed different strategies can be followed according to the relative positioning of these two speed thresholds, without departing from the spirit of the present invention.); a "Call Detected" event generated by the call detector circuit 121 when energy is sensed on the audio IN signal coming from the mobile apparatus 130 through the switch fabric b of the switch unit 110; and a "Time Out" event generated upon expiration of an internal timer launched by the wireless communication manager unit 150.

Figure 2:
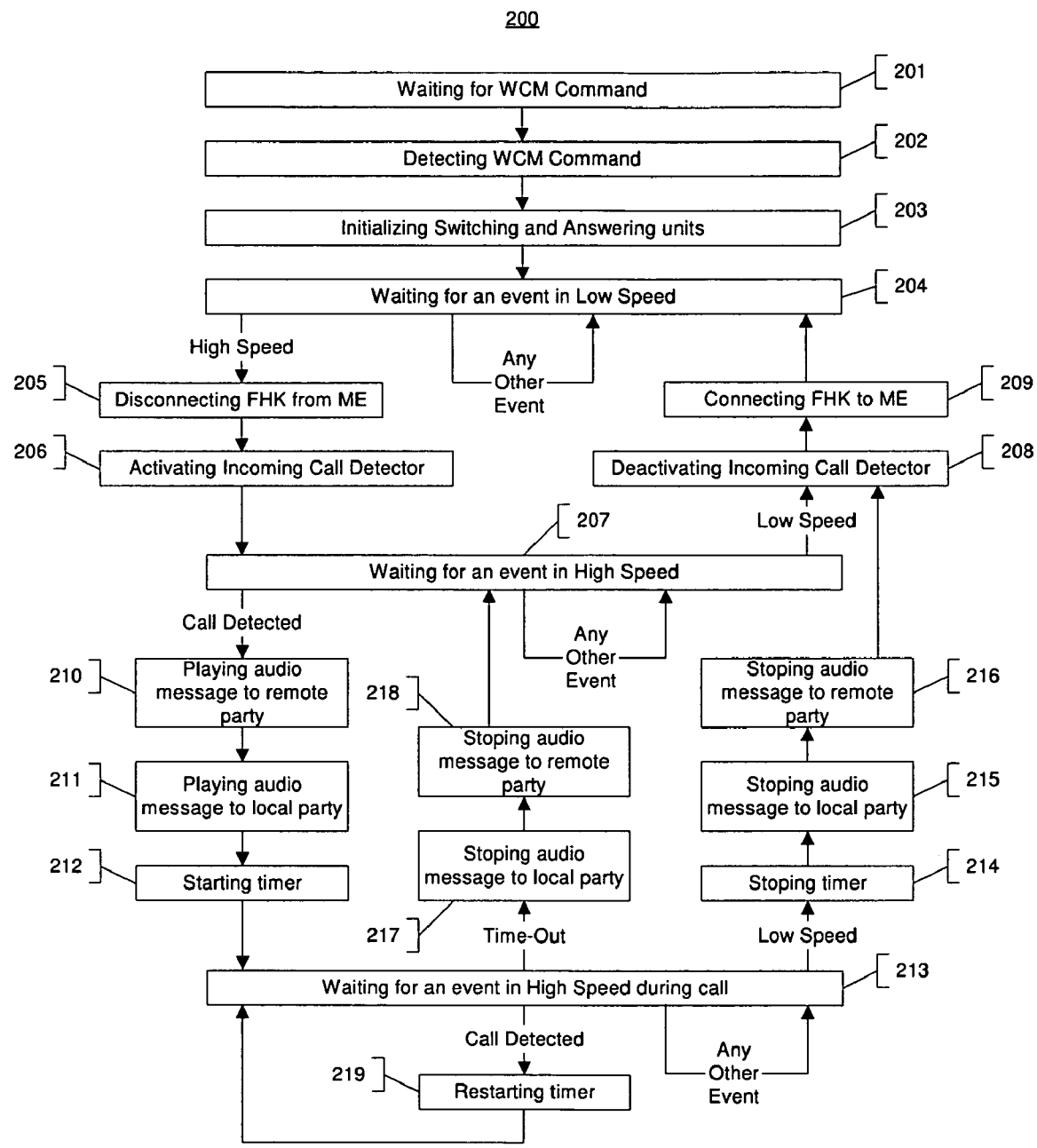
FIG. 2 is a flowchart illustrating a preferred method for managing wireless communications according to a preferred embodiment of the present invention.

The method for managing wireless communications within a moving vehicle is summarised in flowchart 200 of FIG. 2. This method can be considered as the processing of the "WCM" ("wireless communication manager") command. The method comprises the following steps.

At step 201, the method is in its default state, waiting for a WCM command. At step 202, a WCM command is detected, as a result, for instance, of the starting of the vehicle. At step 203, the switch unit 110 and the answering unit 120 are initialized. At step 204, the method enters into a state waiting for an event. If a "High Speed" event is detected, then control is given to step 205. If any other event is detected, then control remains within this step 204 for handling any future event.

At step 205, the free hand kit 140 is disconnected from the mobile apparatus 130 by opening the audio IN and audio OUT circuits via switch fabrics a, b, c, and d in the switch unit 110. For this purpose, and referring to FIG. 1, each of the four switch fabrics a, b, c, and d connects the audio signal on the right side with the lower signal on the left side.

At step 206, the call detector circuit 121 is activated, so that any energy sensed on the audio IN signal coming from switch fabric b of the switch unit 110 results in the generation of a "Call Detected" event.

At step 207, the method enters into a state waiting for an event. If a "Low Speed" event is detected, then control is given to step 208. If a "Call Detected" event is detected, then control is given to step 210. If any other event is detected, then control remains within this step 207 for handling any future event.

At step 208, the call detector circuit 121 is no longer activated, so that any energy sensed on the audio IN signal coming from switch fabric b of the switch unit 110 does not result into the generation of a "Call Detected" event.

At step 209, the free hand kit 140 is connected to the mobile apparatus 130 by closing the audio IN and audio OUT circuits using switch fabrics a, b, c, and d in the switch unit 110. For this purpose, and referring to the FIG. 1, each of the four switch fabrics a, b, c, and d connects the audio signal on the right side with the upper signal on the left side. Then control is given to step 204.

At step 210, an audio message is played to the remote party in response to the audio to remote party circuit 122 feeding the mobile apparatus 130 through the switch fabric a in the switch unit 110.

At step 211, an audio message is played to the local party in response to the audio to local party circuit 123 feeding the speaker 142 through switch fabric c of the switch unit 110, and then the free hand kit 140.

At step 212, an internal timer is started. At step 213, the method enters into a state waiting for an event. If a "Low Speed" event is detected, then control is given to step 214. If a "Call Detected" event is detected, then control is given to step 219. If a "Time Out" event is detected, then control is given to step 217. If any other event is detected, then control remains within this step 213 for handling any future event. At step 214, the internal timer, previously started at step 212, is stopped.

At step 215, the audio message to the local party is stopped, as the audio to local party circuit 123 no longer feeds the speaker 142 through switch fabric c of the switch unit 110, and then through the free hand kit 140.

At step 216, the audio message to the remote party is stopped, as the audio to remote party circuit 122 no longer feeds the mobile apparatus 130 through switch fabric a of the switch unit 110. Control is then given to step 208.

At step 217, the audio message to the local party is stopped, as the audio to local party circuit 123 no longer feeds the speaker 142 through switch fabric c of the switch unit 110, and then through the free hand kit 140.

At step 218, the audio message to the remote party is stopped, as the audio to remote party circuit 122 no longer feeds the mobile apparatus 130 through switch fabric a of the switch unit 110. Control is then given to step 207.

At step 219, the internal timer is restarted. Control is then given back to step 213.

In an alternate embodiment, a fifth switch for either opening or closing the RF line between the mobile apparatus 130 and the free hand kit 140, is added in the switch unit 110. In addition, the WCM method includes a further step between steps 218 and 207, during which this fifth switch opens the RF line during a fixed period of time. This period of time must be long enough to force any remaining active communication to be closed. Then the RF line is closed. This alternate embodiment is directed to the specific case where an unattended external caller attempts to establish a communication and where no automated call termination means exist.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope and spirit of the invention. All such changes and modifications are intended to be included within the scope of the invention as defined by the appended claims.

What we claim is:

1. A system in a moving vehicle for controlling wireless communications between a local party driving the moving vehicle and a remote party, comprising:
   a speed control unit for providing information on a speed of the moving vehicle;
   a mobile apparatus;
   a free hand kit coupled to the mobile apparatus; and
   a wireless communication manager unit coupled to the speed control unit, the mobile apparatus, and the free hand kit, comprising:
      an answering unit, comprising:
         a call detector circuit;
         an audio to remote party circuit; and
         an audio to local party circuit;
      and
      a switch unit, coupled to the speed control unit, for selectively disconnecting the mobile apparatus and the free hand kit when the speed of the moving vehicle exceeds a first predefined speed limit, wherein the switch unit connects an audio in signal from the mobile apparatus to the call detector circuit, connects an audio out signal of the mobile apparatus to the audio to remote party circuit, and connects an audio in signal of the free hand kit to the audio to local party circuit, when the speed of the moving vehicle exceeds the first predefined speed limit;
   wherein the wireless communication manager unit suspends a wireless communication to the mobile apparatus to prevent conversation between the local and remote party, without cutting off the wireless communication, when the speed of the moving vehicle exceeds a first predefined speed limit.

2. The system according to claim 1, wherein the wireless communication manager unit reestablishes the suspended wireless communication when the vehicle speed decreases below a second predefined speed limit.

3. The system according to claim 1 wherein the call detector circuit further comprises:
   a system for detecting a variation of energy in the audio in signal from the mobile apparatus.

4. The system according claim 2, wherein the switch unit suspends the wireless communication to the mobile apparatus by switching off audio signals between the free hand kit and the wireless communication manager unit.

5. The system according to claim 2, wherein the switch unit reestablishes the wireless communication to the mobile apparatus by switching on audio signals between the free hand kit and the wireless communication manager unit.

6. The system according to claim 2, wherein the audio to remote party circuit informs the remote party that the wireless communication is suspended, and wherein the audio to local party circuit informs the local party that the wireless communication is suspended.

7. The system of claim 6, wherein the audio to remote party circuit plays an audio message through the mobile apparatus to inform the remote party that the wireless communication is suspended, and wherein the audio to local party circuit plays an audio message through the free hand kit to inform the local party that the wireless communication is suspended.

8. The system according to claim 7, wherein the audio to remote party circuit stops playing the audio message through the mobile apparatus when the suspended wireless communication is re-established, and wherein the audio to local party circuit stops playing the audio message through the free hand kit when the suspended wireless communication is re-established.

9. The system according to claim 7, wherein the audio messages are repeated periodically.

10. The system according to claim 7, further comprising:
   a system for starting an internal timer with a predefined amount of time, when the wireless communication is suspended;
   a system for stopping the audio message to the local party played through the free hand kit, if a time out event is detected by the internal timer; and
   a system for stopping the audio message to the remote party played through the mobile apparatus, if a time out event is detected by the internal timer.

11. The system according to claim 10, further comprising:
   a system for disconnecting, for a predefined period of time, the free hand kit from the mobile apparatus, if a time out event is detected by the internal timer.

12. The system according to claim 10, further comprising:
   a system for stopping the internal timer when the suspended wireless communication is re-established.

* * * * *